UNITED STATES PATENT OFFICE.

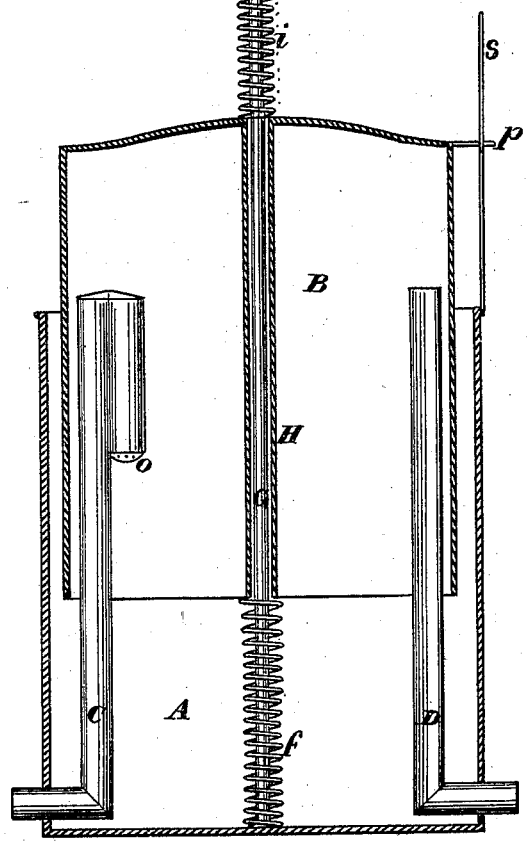

LOUIS MARKS, OF SAN FRANCISCO, CALIFORNIA.

IMPROVEMENT IN GAS-HOLDERS.

Specification forming part of Letters Patent No. 171,028, dated December 14, 1875; application filed October 9, 1875.

*To all whom it may concern:*

Be it known that I, LOUIS MARKS, of San Francisco city and county, State of California, have invented Improvement in Gas Holders and Purifiers; and I do hereby declare the following description and accompanying drawings are sufficient to enable any person skilled in the art or science to which it most nearly appertains to make and use my said invention or improvement without further invention or experiment.

My invention relates to certain improvements in the gas-holders through which gas is passed on its way from the carbureting-vessel to the burners.

Referring to the accompanying drawing, Figure 1 is a sectional elevation of my gas-holder.

A is the outer vessel or tank, in which the water is contained; and B is the inverted inside vessel, the open mouth of which enters the water in the tank A. C is a pipe, which enters through the side of the tank A, and extends upward until its upper end is above the level of the water contained in the tank. Its upper end is then bent downward until its open end is below the surface of the water. The immersed end of this tube is covered by a perforated end piece or cap, o. D is another pipe, which enters through the opposite side of the tank, and extends upward inside of the tank, so as to terminate above the surface of the water.

The gas is drawn into the gasometer through the pipe C, and passes to the burners through the pipe D. It is therefore evident that, as the pipe C terminates below the surface of the water, the gas will be compelled to pass through the water in order to enter the gas space or chamber in the upper part of the vessel, thus washing the gas, and separating from it all extraneous matter and acid which it may contain.

In order to prevent the jumping of the light at the burner by the sudden reduction of the pressure in the gas-holder, I place a spiral spring, $f$, around the upright guide-rod G, which passes upward through the center of the inverted vessel B, so that the lower end of the tube H, which fits over the guide-rod, will rest upon the spring when the vessel is in place. I then place another spiral spring, $i$, upon the rod G, above the vessel B, and confine it by securing a button, J, on the upper end of the rod.

The purpose of the second spring is to adjust the rod between the two, and thus prevent any sudden movement of the gas-holder upon the sudden reduction or increase of gas, and thereby increase the steadiness of the light, as the vessel B will then be supported between the two springs, so that its action will be gradual and easy, thus obviating the trouble above mentioned.

In order to prevent the vessel B from turning about inside of the vessel A, I make an eye, $p$, on the upper edge of the vessel B, through which a vertical guide-rod, $s$, which is secured to the vessel A, passes, so that the vessel is kept in its proper position.

Having thus described my invention, what I claim, and desire to secure by Letters Patent, is—

The inverted vessel B, supported upon the central upright guide-post G between the spiral springs $f$ $i$, substantially as and for the purpose described.

LOUIS MARKS.

Witnesses:
 JNO. L. BOONE,
 C. M. RICHARDSON.